No. 808,208. PATENTED DEC. 26, 1905.
L. R. MAXWELL.
JACK FOR AUTOMOBILES.
APPLICATION FILED NOV. 11, 1904.

2 SHEETS—SHEET 1.

Witnesses

Lee R. Maxwell,
Inventor by Attorneys

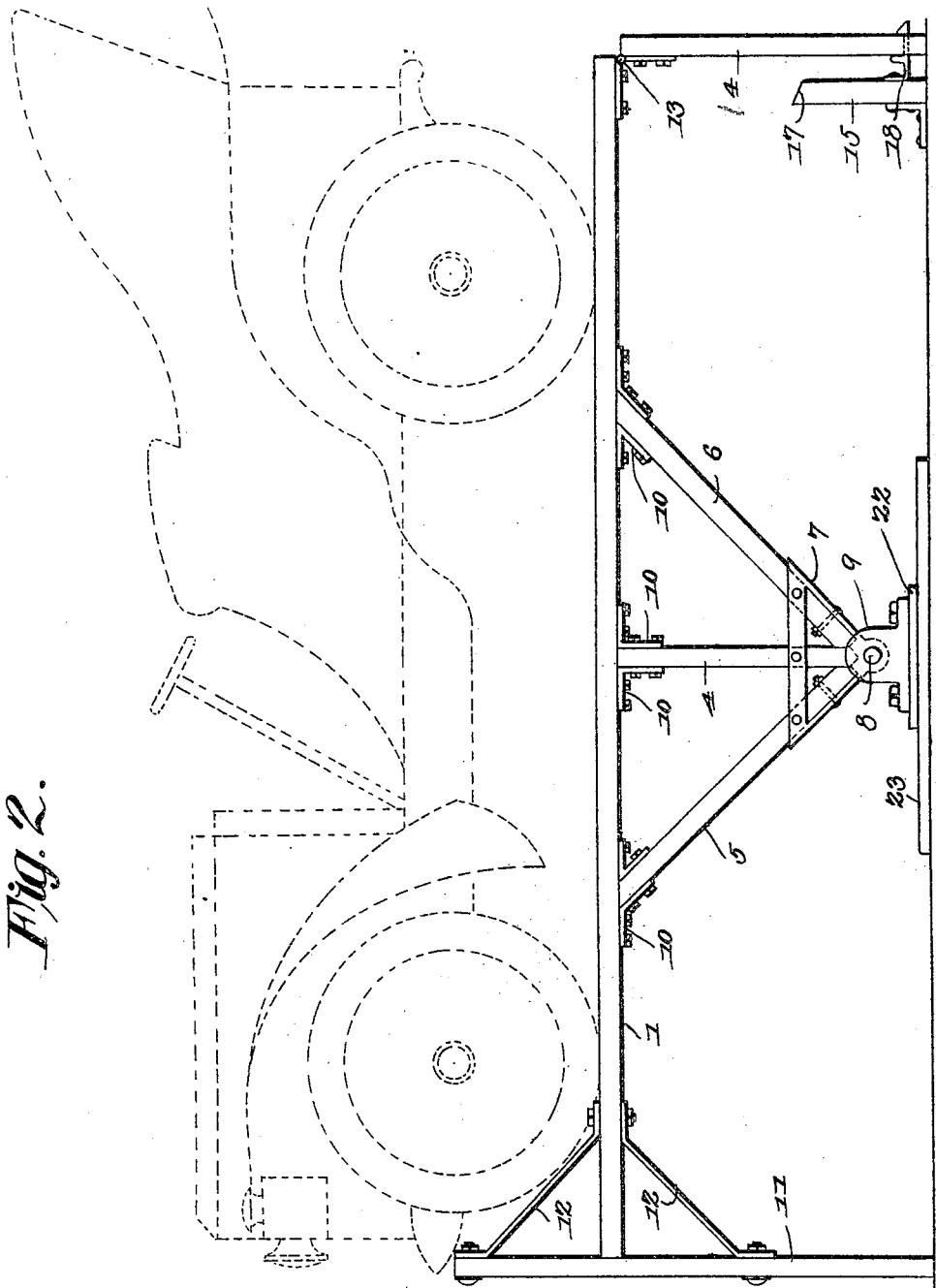

UNITED STATES PATENT OFFICE.

LEE R. MAXWELL, OF CEDAR RAPIDS, IOWA.

JACK FOR AUTOMOBILES.

No. 808,208.         Specification of Letters Patent.         Patented Dec. 26, 1905.

Application filed November 11, 1904. Serial No. 232,337.

*To all whom it may concern:*

Be it known that I, LEE R. MAXWELL, a citizen of the United States, residing at Cedar Rapids, in the county of Linn and State of Iowa, have invented new and useful Jacks for Automobiles, of which the following is a specification.

This invention relates to jacks adapted especially for raising and supporting automobiles; and its primary object is to provide a device of this character which will be automatically operated by the weight of the automobile or other vehicle to support the latter when in elevated position.

Further objects of the invention are to provide means for preventing the accidental lowering of the jack and for preventing the automobile from running off the support after it is elevated.

The invention comprises parallel trackways secured to pivoted supports in such a manner as to cause the trackways to assume a horizontal position by the weight of the automobile as the latter is run thereon and means for maintaining said trackways in such position.

The invention further consists in the features of construction hereinafter fully described, and particularly pointed out in the appended claims.

Figure 3:
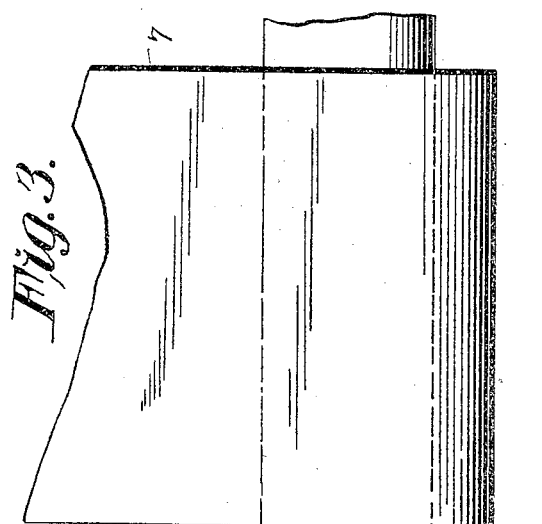
Figure 4:
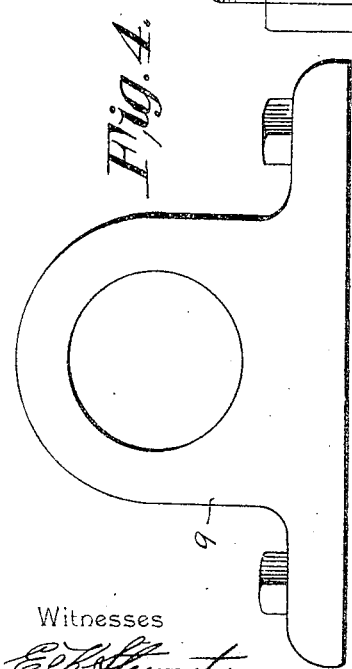
Figure 1:
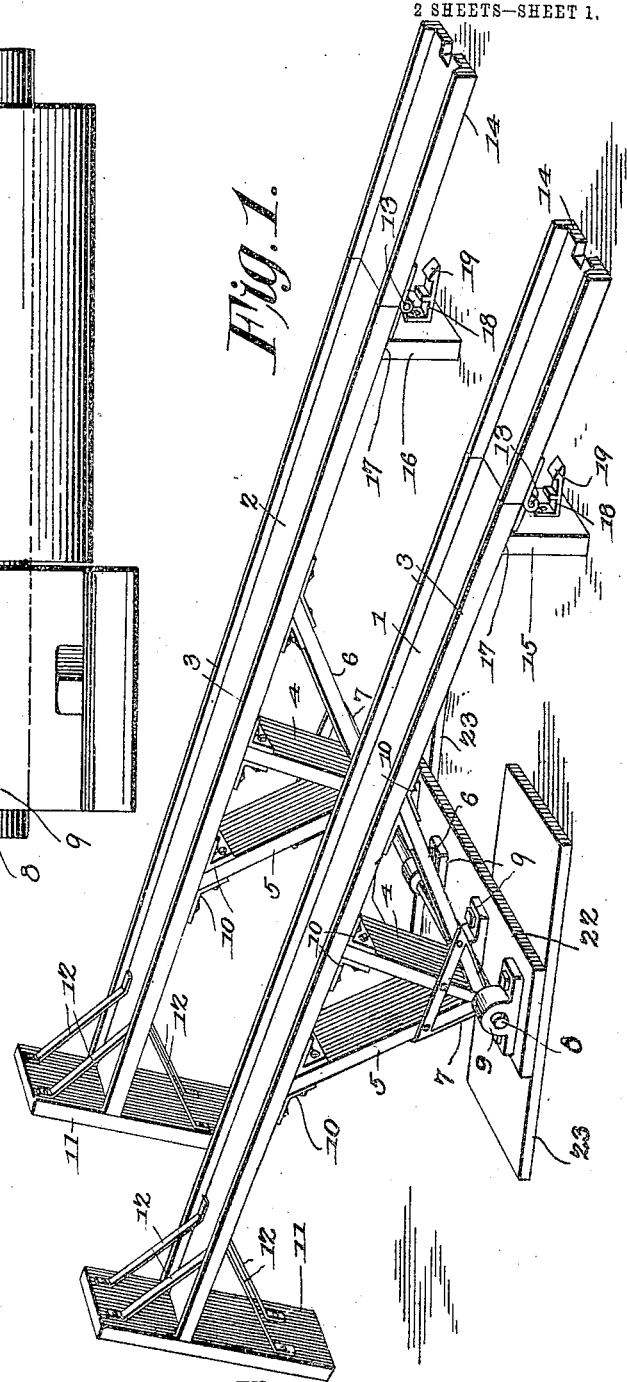

In the drawings, Figure 1 is a view in perspective of an automobile jack or elevator embodying the invention, the trackways being in the normal inclined position which they occupy when not in use. Fig. 2 is a side elevation of the jack, showing the horizontal position of the trackways and the means employed for maintaining them in this position. Fig. 3 is a side elevation of one of the bearings employed for the trackway-supports, and Fig. 4 is a detail front elevation of one of the bearings of the trackway-support.

The reference-numerals 1 and 2 designate a pair of trackways of sufficient length to afford a support for the wheels of an automobile or other vehicle and formed with side guard-flanges 3 to prevent the wheels from leaving the track. Each of the trackways is centrally secured upon a tilting support of suitable construction. In the form shown in the drawings this support comprises a series of radially-disposed braces (designated, respectively, by the numerals 4, 5, and 6,) connected at their lower ends by a pair of brackets 7, said brackets each being of general triangular shape and constructed to receive the ends of the braces.

Each of the brackets 7 is formed with an opening to receive a rod or shaft 8, which also extends through bearings in castings 9. The upper ends of the braces are firmly secured to the under sides of the trackways by angle-plates 10, located on opposite sides of the braces, as shown.

To the upper end of each of the trackways is secured an upright 11, preferably by means of brace-rods 12. A portion of each of the uprights 11 projects above the surface of the trackway to serve as a buffer or stop to prevent the wheels of the automobile from leaving the track, while the lower ends of said uprights are adapted to rest upon the floor when the trackways are in a horizontal position.

To the lower end of each of the trackways is secured, by means of a hinge 13, an extension 14, said extensions being adapted to turn down to a vertical position to serve as the supporting-legs for the trackways when they are in a horizontal position.

15 and 16 designate blocks secured below the lower ends of the trackways and having their upper edges 17 beveled to adapt them to support the ends of the trackways. For the purpose of locking the leg extensions 14 in vertical position I provide spring-catches 18, which are secured at one end either to the blocks 15 and 16 or to the floor adjacent to said blocks. The free ends 19 of the spring-catches 18 are beveled to permit the recessed ends 20 of the leg extensions to readily pass over them.

While the invention is not restricted to the employment of any specific form of bearing for the supports 4, 5, and 6, it being only necessary to insure the required oscillatory movement of the trackways, I have found the form of bearing illustrated in Figs. 3 and 4 especially well adapted for use with my improvement.

The improvement is designed for use either as a portable or a stationary device. When it is designed for use as a portable apparatus, a base-board 22 connects the two oscillatory supports, the castings 9 being bolted to said base-board. If desired, additional foundation-boards 23, extending lengthwise of the trackways, may be employed, as illustrated in Figs. 1 and 2; but both the base-boards 22 and 23 may be omitted when the apparatus is to be made a permanent adjunct of a barn or other building and the castings 9 bolted directly to the floor.

It will be noted that the supports 4, 5, and 6, together with the brackets 7 and castings 9, constitute an oscillatory frame for the trackways, the central supports 4 being secured to the under sides of the trackways at a point midway of their length, while the oppositely-inclined supports 5 and 6 serve as lateral braces to insure a firm and durable construction.

Normally the trackways rest upon the blocks 15, with the leg extensions in the position shown in Fig. 1. When an automobile or other vehicle is run upon the trackways, the latter are tilted to a horizontal position, as shown in Fig. 2, and are maintained in this position by the uprights 11 at one end and at the opposite end by the leg extensions 14, which latter automatically fold to vertical position by the tilting of the trackways and are retained in this position by the spring-catches 18 engaging their lower ends.

It will be apparent that the device is susceptible of embodiment in a variety of constructions, and hence I would have it understood that I reserve the right to make all such changes and modifications of the details of construction as may fall within the scope and spirit of the invention as defined in the following claims.

Having thus described the invention, what I claim is—

1. A jack for elevating automobiles or other vehicles comprising base-bearings, supports fulcrumed in said bearings, trackways secured to said supports and adapted to be tilted by the weight of the automobile, and means for maintaining the trackways in substantially horizontal position.

2. A jack for elevating and supporting automobiles comprising base-bearings, supports fulcrumed in said bearings, parallel trackways secured to said supports and adapted to be tilted by the weight of the automobile, and means for maintaining the trackways in substantially horizontal position, consisting of supports at the ends thereof.

3. A jack for elevating and supporting automobiles comprising base-bearings, supports fulcrumed in said bearings, parallel trackways secured to said supports and adapted to be tilted by the weight of the automobile, and means for maintaining the trackways in substantially horizontal position, consisting of a rigid support at one end of each trackway, and folding supports at the opposite ends of said trackways.

4. A jack for automobiles or other vehicles, comprising base-bearings, supports pivotally secured therein, trackways secured to the supports, and means for maintaining the trackways in the position to which they are elevated by the weight of a vehicle thereon.

5. In a jack for elevating vehicles, the combination with a base, and bearings secured thereto, of oscillatory supports pivotally secured in said bearings, parallel trackways secured to said supports, the pivotal center of the supports being midway of the length of the trackways to adapt the latter to be tilted to horizontal position by the weight of the vehicle, and means for bracing said trackways in such position.

6. In a jack for raising and supporting automobiles or other vehicles, the combination with an oscillatory support, of parallel trackways secured thereto, and means for maintaining said trackways in their elevated position comprising rigid supports at one end of the trackways, and automatically-folding supports at the opposite end of said trackways.

7. In a jack for elevating and supporting automobiles, the combination with a base, of a pair of parallel trackways, bearings secured to the base, an oscillatory central support secured to each trackway and fulcrumed in said bearings, a fixed support at one end of each trackway to aid in supporting it in horizontal position, a folding support at the opposite end of each trackway, and means for detachably securing said folding supports in vertical position.

8. In a jack for elevating and supporting automobiles, the combination with a base, of a pair of parallel trackways, bearings secured to the base, an oscillatory central support secured to each trackway and fulcrumed in said bearings, a fixed support at one end of each trackway projecting above the upper surface of the trackway to serve as a stop or buffer, and a folding support at the opposite end of each trackway for supporting the trackways in horizontal position.

9. In a jack for elevating and supporting automobiles, the combination with parallel trackways, of an oscillatory central support for each trackway, a fixed support at one end of each trackway, an automatically-folding support at the opposite end of each trackway, and fastening devices for securing the ends of the folding supports in vertical position.

10. In a jack for elevating and supporting automobiles or other vehicles, the combination with a pair of parallel trackways, of an oscillatory central support for each trackway, comprising base-bearings, and radially-disposed braces having a pivotal support in said bearings, and means for maintaining said trackways in horizontal position.

11. A jack for automobiles and similar vehicles comprising base-bearings, a tilting platform fulcrumed in said bearings and spaced supports for maintaining the platform in a horizontal position, one of the supports being movable to permit the platform to tilt.

12. A jack for automobiles and similar vehicles comprising base-bearings, a tilting platform fulcrumed in said bearings, and means for limiting the tilting movement in one direction.

13. A jack for automobiles and similar vehicles comprising base-bearings, a tilting platform fulcrumed in said bearings and means for limiting the tilting movement in opposite directions, one of said means being movable to permit tilting movement in one direction.

In testimony that I claim the foregoing as my own I have hereto affixed my signature in the presence of two witnesses.

LEE R. MAXWELL.

Witnesses:
  CHAS. E. MORRIS,
  W. A. BURT.